W. McEWEN.
PNEUMATIC TIRE.
APPLICATION FILED DEC. 13, 1918. RENEWED APR. 18, 1922.
1,422,113.  Patented July 11, 1922.
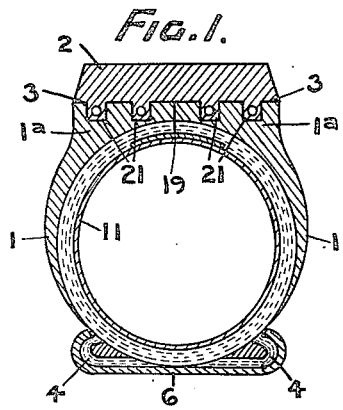
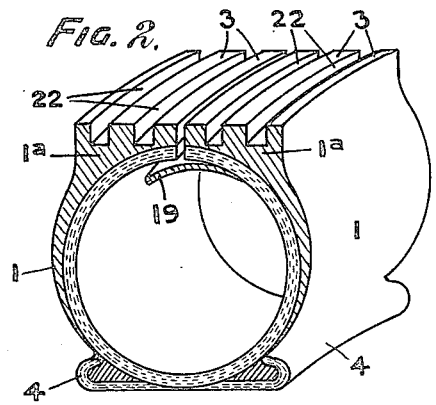
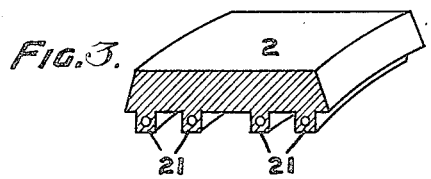
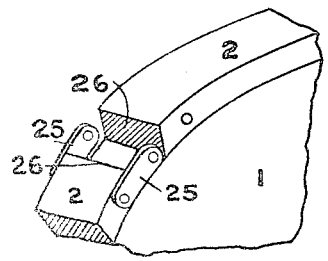
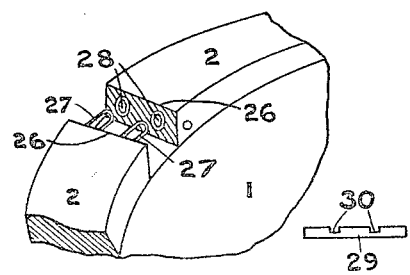
Inventor
William McEwen
by Lawrence Langner
Attorney

UNITED STATES PATENT OFFICE.

WILLIAM McEWEN, OF WAIUKU, AUCKLAND, NEW ZEALAND, ASSIGNOR OF ONE-HALF TO WILLIAM CORY SCOTT HOSKING, OF WAIUKU, AUCKLAND, NEW ZEALAND.

PNEUMATIC TIRE.

1,422,113. Specification of Letters Patent. Patented July 11, 1922.

Application filed December 13, 1918, Serial No. 266,533. Renewed April 18, 1922. Serial No. 555,235.

*To all whom it may concern:*

Be it known that I, WILLIAM McEWEN, a subject of His Majesty the King of the United Kingdom of Great Britain and Ireland, resident of Waiuku, in the Provincial District of Auckland, in the Dominion of New Zealand, have invented an Improved Pneumatic Tire, of which the following is a specification.

This invention relates to pneumatic tires, and its object is to provide a tire the tread of which can be replaced when worn without discarding the whole of the cover.

According to this invention the tire cover is formed with its walls or sides connected at their inner edges, or edges nearest the wheel rim, and with its walls or sides disconnected at their outer edges or edges furthest from the wheel rim. The outer edges of the tire walls are thickened and formed with grooved face thereon, to take a detachable tread which is secured to the outer edges of the walls so as to hold the latter together.

The inner edges of the tire walls can be either beaded or straight edged, as desired, according to the type of wheel rim to which the tire is to be fitted.

The invention will be particularly described with reference to the accompanying drawings, in which, Figure 1 is a cross sectional view of a tire showing form of cover and means for securing the tread in position.

Figure 2 illustrates in perspective the cover used in Figure 1 with the tread removed.

Figure 3 shows in perspective portion of the tread employed in Figure 1.

Figures 4 and 5 illustrate alternative means for connecting the ends of the detachable tread, when the latter is not continuous the tread ends being shown disconnected.

The tire is formed of two parts, a tire proper and a detachable tread 2. The side walls 1, of the tire proper are preferably connected at their inner edges and disconnected at their outer edges 1ª. The tire, at its disconnected or outside portion, is thickened to provide a relatively broad external peripheral face 3 to receive the tread 2 which is provided with a broad internal peripheral face to substantially match the external peripheral face of the tire proper.

The external peripheral face 3 of the tire proper is provided with annular grooves 22 arranged parallel to each other and preferably having their side walls substantially perpendicular to the axis of rotation of the wheel.

The internal peripheral face of the tread is provided with annular ribs 21 extending parallel to each other and being adapted to fit into the grooves 22 in the external face of the tire proper. The ribs 21 and the grooves 22 are adapted to match and therefore firmly hold the tread 2 to the face 3 of the tire proper. If desired the ribs 21 may be reinforced by cords or wires.

While it is preferable in some cases to have the tread 2 endless or continuous this is not always desirable and where it is necessary to connect the tread ends side plates 25 (Figure 5) adapted to be bolted to each of the ends 26 can be used or the device illustrated in Figure 6 may be employed. In the latter loops 27 are partially embedded in one of the tread ends 26, the projecting loops 27 are entered into the sockets 28 and a cross pin 29 passed through the loops to retain them in the sockets, the pin 29 having cut out portions 30 in which the loops engage and prevent the pin 29 from falling out.

I claim as my invention:

In combination, a pneumatic tire having the inner edges of its walls connected and the outer edges of its walls disconnected and thickened to form a relatively broad external peripheral face and having annular grooves in said peripheral face of the tire; a detachable tread having a broad internal peripheral face to substantially match the external peripheral face of the tire, said internal peripheral face of the tread having annular ribs adapted to fit into and match the annular grooves in the external face of the tire whereby when said tread is attached to said tire the former is held to the latter against movement laterally thereof, said tread being split transversely to permit its being wrapped around the tire in being mounted thereon, the walls of said annular grooves in the tire being parallel with each other and substantially perpendicular to the axis of rotation of the tire and the walls of said ribs being likewise formed so that the tread can be mounted on the tire by merely wrapping the same around the tire, the ribs seating themselves in said grooves; and means for securing the ends of said tread together to hold the same firmly to the tire.

WILLIAM McEWEN.

Witnesses:
GEORGE WILLIAM BASLEY,
ERNEST WILFRED BOYCE CAREY.